United States Patent
Avner et al.

(10) Patent No.: US 8,965,835 B2
(45) Date of Patent: *Feb. 24, 2015

(54) METHOD FOR ANALYZING SENTIMENT TRENDS BASED ON TERM TAXONOMIES OF USER GENERATED CONTENT

(75) Inventors: Amit Avner, Herzliya (IL); Omer Dror, Tel Aviv (IL); Itay Birnboim, Tel Aviv (IL)

(73) Assignee: Taykey Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/214,588

(22) Filed: Aug. 22, 2011

(65) Prior Publication Data

US 2011/0302006 A1 Dec. 8, 2011

Related U.S. Application Data

(63) Continuation-in-part of application No. 13/050,515, filed on Mar. 17, 2011.

(60) Provisional application No. 61/316,844, filed on Mar. 24, 2010.

(51) Int. Cl.
| | |
|---|---|
| G06F 17/30 | (2006.01) |
| G06Q 30/00 | (2012.01) |
| G06Q 30/02 | (2012.01) |
| G06F 17/27 | (2006.01) |
| G06Q 50/00 | (2012.01) |

(52) U.S. Cl.
CPC ........ *G06Q 30/0201* (2013.01); *G06F 17/2785* (2013.01); *G06Q 30/0241* (2013.01); *G06Q 50/01* (2013.01)

USPC .................. 707/600; 707/777; 707/E17.009; 707/E17.014; 705/14.4

(58) Field of Classification Search
USPC .......................... 707/600, 748, 777; 705/14.4
See application file for complete search history.

(56) References Cited

U.S. PATENT DOCUMENTS

| | | | |
|---|---|---|---|
| 6,463,430 | B1 | 10/2002 | Brady et al. |
| 7,426,499 | B2 | 9/2008 | Eder |
| 7,428,554 | B1 | 9/2008 | Coberley et al. |
| 7,433,876 | B2 | 10/2008 | Spivack et al. |

(Continued)

FOREIGN PATENT DOCUMENTS

| | | |
|---|---|---|
| JP | 2000305952 | 11/2000 |
| KR | 20090034052 | 4/2009 |

(Continued)

OTHER PUBLICATIONS

International Searching Authority, "International Search Report and Written Opinion" for the corresponding International Patent Application PCT/IL2011/028846; Date of Mailing: Sep. 28, 2011.

*Primary Examiner* — Shyue Jiunn Hwa
(74) *Attorney, Agent, or Firm* — M&B IP Analysts, LLC

(57) ABSTRACT

A method for generating a trend report for a non-sentiment phrase. The method comprises generating a plurality of term taxonomies between non-sentiment phrases and sentiment phrases; storing the plurality of term taxonomies in a database; performing periodically at least a statistical analysis respective of the plurality of term taxonomies in the database; receiving a request for a report with respect of at least a non-sentiment phrase in the database; generating a trend report based at least on the at least statistical analysis; and providing the report to the requestor of the report.

22 Claims, 6 Drawing Sheets

(56) References Cited

U.S. PATENT DOCUMENTS

| | | |
|---|---|---|
| 7,620,628 B2 | 11/2009 | Kapur et al. |
| 2007/0100779 A1* | 5/2007 | Levy et al. .................... 705/500 |
| 2007/0106627 A1 | 5/2007 | Srivastava et al. |
| 2007/0143296 A1 | 6/2007 | Casion |
| 2007/0192300 A1 | 8/2007 | Reuther et al. |
| 2007/0276676 A1 | 11/2007 | Hoenig et al. |
| 2008/0027769 A1 | 1/2008 | Eder |
| 2008/0082463 A1 | 4/2008 | Cheng et al. |
| 2008/0109285 A1 | 5/2008 | Reuther et al. |
| 2008/0133488 A1* | 6/2008 | Bandaru et al. .................... 707/3 |
| 2008/0243531 A1 | 10/2008 | Hyder et al. |
| 2008/0249764 A1 | 10/2008 | Huang et al. |
| 2008/0263589 A1 | 10/2008 | Jacobson et al. |
| 2008/0281915 A1 | 11/2008 | Elad et al. |
| 2009/0164400 A1 | 6/2009 | Amer-Yahia et al. |
| 2009/0164897 A1 | 6/2009 | Amer-Yahia et al. |
| 2009/0193011 A1 | 7/2009 | Blair-Goldensohn et al. |
| 2009/0216581 A1* | 8/2009 | Carrier et al. .................... 705/7 |
| 2009/0292584 A1 | 11/2009 | Dalal et al. |
| 2010/0070293 A1 | 3/2010 | Brown et al. |
| 2010/0100537 A1 | 4/2010 | Druzgalski et al. |
| 2010/0262454 A1* | 10/2010 | Sommer et al. .................. 705/10 |
| 2011/0137906 A1* | 6/2011 | Cai et al. ....................... 707/740 |

FOREIGN PATENT DOCUMENTS

| | | |
|---|---|---|
| KR | 20090068803 | 6/2009 |
| KR | 20090080822 | 7/2009 |

* cited by examiner

METHOD FOR ANALYZING SENTIMENT TRENDS BASED ON TERM TAXONOMIES OF USER GENERATED CONTENT

CROSS-REFERENCE TO RELATED APPLICATIONS

This application is a continuation-in-part of U.S. patent application Ser. No. 13/050,515 filed on Mar. 17, 2011, and claims the benefit of U.S. provisional application No. 61/316,844 filed on Mar. 24, 2010, the contents of which are incorporated herein by reference.

TECHNICAL FIELD

The invention generally relates to the generation of taxonomies based on information available on the Internet, and more specifically to the generation of taxonomies with respect to a plurality of terms, particularly social terms, and respective sentiments thereto.

BACKGROUND OF THE INVENTION

There is an abundance of information available on the Internet as user generated content such as web pages, social networks, as well as other sources of information, which are accessible via the world-wide web (WWW). Search systems make the access to such information speedy and generally cost effective. However, there are certain disadvantages, one of which is the fact that even targeted searches to generally available information results in large amounts of 'hits' requiring the user to sift through a lot of information that is less than valuable. The search is static by nature and over time, as more and more irrelevant data is available, the more difficult it is to get to meaningful information.

Various users of information are concerned with a more elaborate analysis of the information available through the WWW and have interest also in the time-value of such information. That is, older information may be less interesting than newer information and the trends relating to the information may be more interesting than the data relating to the information at any given point in time. Current solutions monitor online behavior rather than attempting to reach intents. For example, today advertisers attempting to target customers can merely do so based on where the customers go, what they do and what they read on the web. For example, when a user reads about the difficulties of a car manufacturer providing an advertisement for the purchase of a car, it is not necessarily the right type of advertisement. In other words, today's available solutions are unable to distinguish this case from an article where the same company presents a new model of a car. Likewise, the prior art solutions are unable to correlate items appearing in such sources of information to determine any kind of meaningful relationship.

An ability to understand human trends dynamically as they are expressed would be of significant advantage to advertisers, presenters, politicians, chief executive officers (CEOs) and others who may have a concern in such deeper understanding of the information. Tools addressing such issues are unavailable today.

It would be advantageous to provide tools that would provide real-time information regarding trends of certain terms, and specifically, sentiment trends with respect to such terms.

SUMMARY OF THE INVENTION

Certain embodiments disclosed herein include a system for analyzing sentiment trends based on term taxonomies of user generated content. The system comprises a network interface enabling access to one or more data sources through a network; a mining unit for collecting textual content from the one or more sources and generating phrases, the phrases including sentiment phrases and non-sentiment phrases; a data warehouse storage connected to the network; and an analysis unit for generating at least associations between a non-sentiment phrase and a sentiment phrase based on the generated phrases, an association between a non-sentiment phrase and at least one corresponding sentiment phrase is a term taxonomy, wherein generated term taxonomies are saved in the data warehouse, the analysis unit further periodically statistically analyzes the stored term taxonomies to determine at least a statistical trend of at least one non-sentiment phrase with respect of the respective sentiment phrases, the analysis unit stores results of the at least statistical trend in the data warehouse storage, wherein the stored results are available upon receiving a request to generate a trend report regarding the at least statistical trend.

Certain embodiments disclosed herein also include an apparatus for trend analysis of non-sentiment phrases appearing in at least one data source. The apparatus comprises a mining unit for periodically associating one or more sentiment phrases to one or more non-sentiment phrases; a storage unit for storing the one or more non-sentiment phrases and their respective one or more sentiment terms; and an analysis unit for periodically determining at least a sentiment trend of a at least one non-sentiment phrase stored in the storage unit.

Certain embodiments disclosed herein further include a method for generating a trend report for a non-sentiment phrase. The method comprises generating a plurality of term taxonomies between non-sentiment phrases and sentiment phrases; storing the plurality of term taxonomies in a database; performing periodically at least a statistical analysis respective of the plurality of term taxonomies in the database; receiving a request for a report with respect of at least a non-sentiment phrase in the database; generating a trend report based at least on the at least statistical analysis; and providing the report to the requestor of the report.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
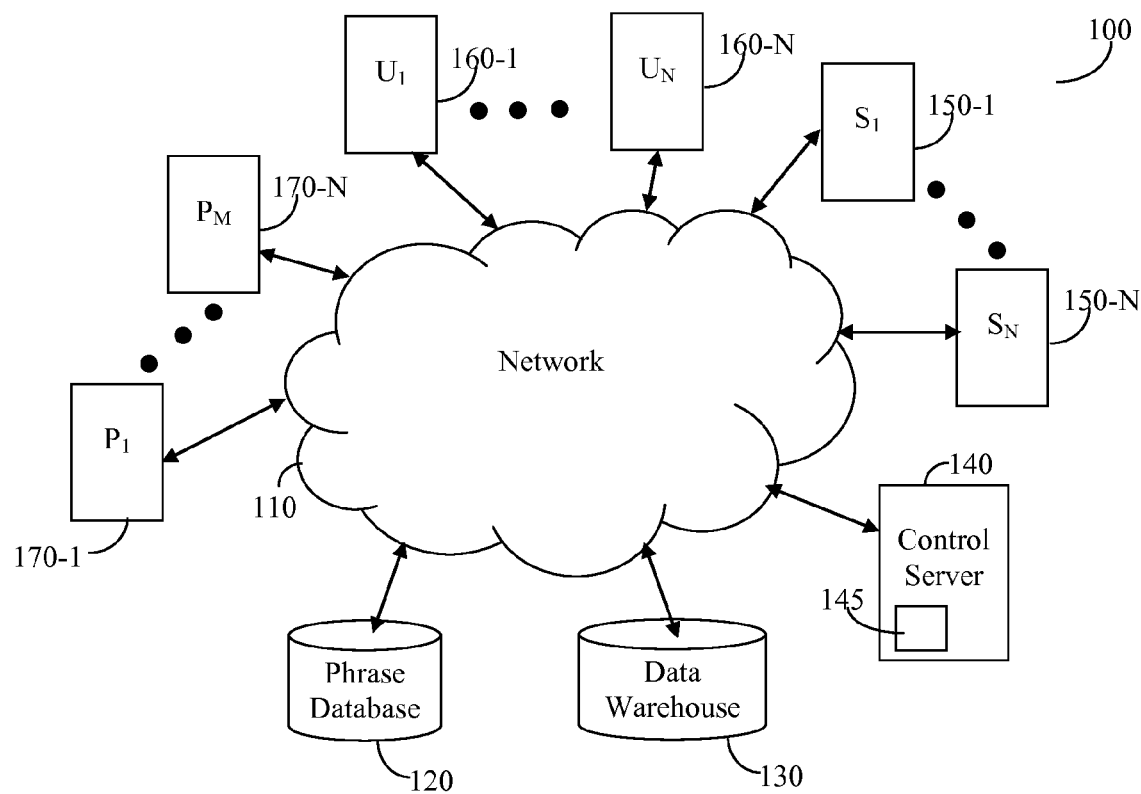
FIG. 1 is a schematic diagram of a system for creation of term taxonomies and analyzing sentiment trends by mining web based user generated content n.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to exemplary embodiments of the invention system and method for real-time sentiment trend analysis based on taxonomies are provided. The method further enables providing of notification with respect of trend of mentioning the term in general and in particular with respect of a sentiment in at least one of a plurality of web-based user generated content sources such as social networks. For example, the method may detect that a brand name is mentioned less frequently in a social network, therefore potentially providing an indication of a need to increase advertisement. This may be further refined to identify the characteristics of the social network and provide an even more targeted response. In an exemplary embodiment, correlation between potentially dissimilar terms is also provided for the purpose of trend analysis.

FIG. 1 depicts an exemplary and non-limiting schematic diagram of a system 100 for creation of term taxonomies analyzing sentiment trends. To a network 110 there are connected various components that comprise the system. The network 110 can be a local area network (LAN), a wide area network (WAN), a metro area network (MAN), the world wide web (WWW), the Internet, the likes, and combinations thereof.

A phrase database 120 is connected to the network 110 and contains identified phrases that are either preloaded to the database 120 or, that were detected during operation of the system as such phrases, and as further explained in greater detail herein below. Phrases may contain, but are not limited to terms of interest, brand names, and the like. A data warehouse 130 is also connected to the network 110, for storing processed information respective of phrases and as further explained in greater detail herein below. The operation of the system 100 is controlled by a control server 140 having code stored in memory 145, such that the control server 140 may perform the tasks discussed in more detail herein below.

The processing may be performed using solely the control server 140. Alternatively or collectively the system 110 may include one or more processing units 170 which allow for handling of the vast amount of information needed to be worked on. Also connected to the network 110 are one or more sources of web-based user-generated content 150-1 through 150-M (collectively information sources 150). The information sources 150 include, but are not limited to social networks, web pages, and news feeds. These may include, but are not limited to, social networks, e.g., Facebook®, Twitter™, web pages, blogs, and other sources of textual information. Typically a plurality of users using user nodes 160-1 through 160-N (collectively user nodes 160) access the information sources 150 periodically and provide their own comments and information therein. As described in further detail with respect of FIG. 2 these types and pieces of information are processed by the system 100.

Figure 2:
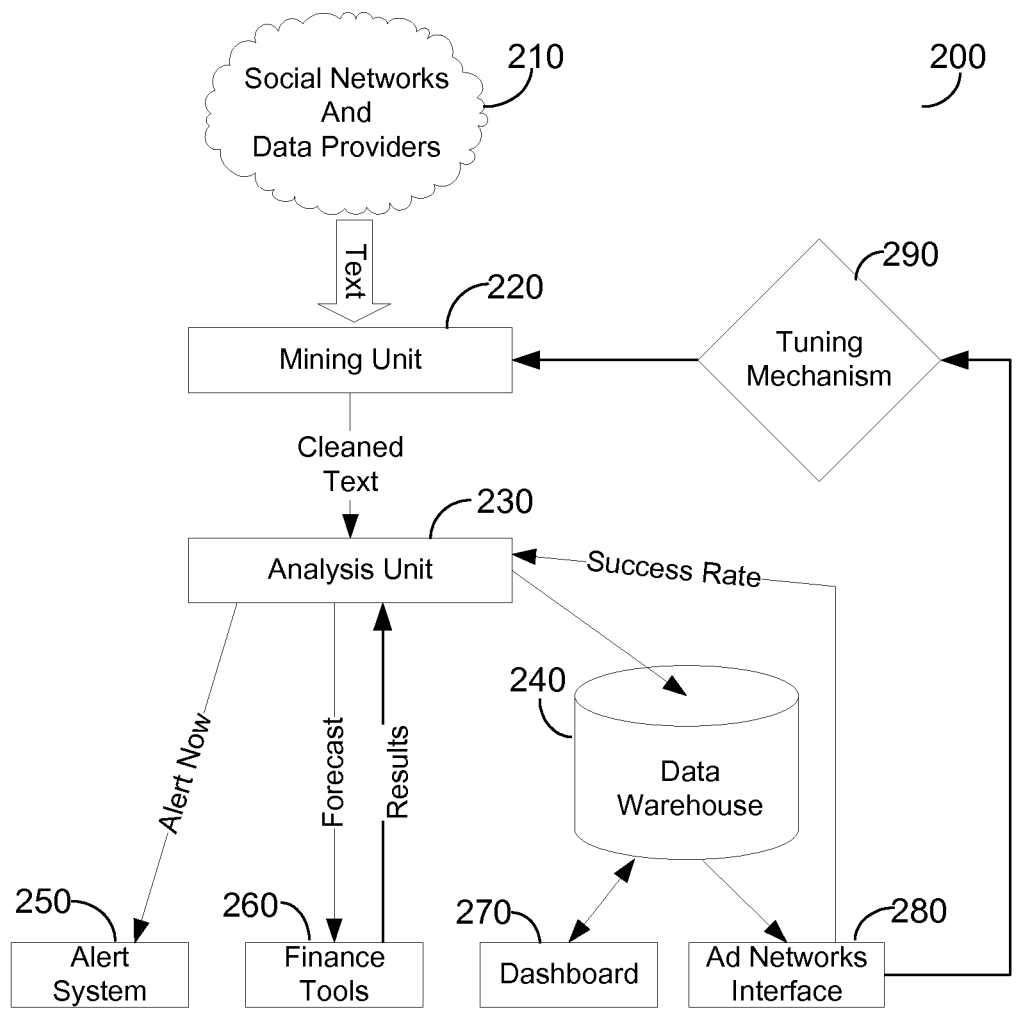
FIG. 2 is an overview block diagram of the operation of the system depicted in FIG. 1.

FIG. 2 shows an exemplary and non-limiting overview block diagram 200 of the operation of the system 100. One or more data sources 210 including, but not limited to, social networks and other user provided sources are checked and or regularly supplied for text to be provided to a mining unit 220 that performs a mining process. The access to the data sources 210 is through the network 110 by means of a network interface (not shown).

The task of the mining process is to extract from the text all irrelevant data that cannot be effectively used in the analysis that is performed by the system 100. Basically, this mining task is to identify sentiment phrases and non-sentiment phrases. In addition to sentiment extraction, the mining process "cleans" the collected data. Sentiment phrases may include, but not by way of limitation, words such as "love", "hate", "great", "disaster", "beautiful", "ugly" and the like, but also "not good", "great time", "awfully good", and more. Cleaning of data may comprise phrases common in social networks such as, but not limited to, conversion of "GRREEEAT!" into "great" and so on. In addition, the cleaning may include removing conjunctions and words that appear in an extremely high frequency or are otherwise unknown or irrelevant. While single words have been shown here, multiple words grouped as a phrase may also be treated as a sentiment phrase, such as but not by way of limitation "great experience", "major issues", "looks great" and more. These words describe a sentiment typically applied to a non-sentiment phrase.

The text coming in from the source(s) 210 is mined for such phrases, for example, by using a reference for phrases stored in a database, such as phrase database 120. The mining process includes understanding that the complex phrase of "I hate I love Lucy" actually comprises a sentiment phrase "hate" and a non-sentiment phrase "I love Lucy", where the word "love" in the non-sentiment phrase is not to be analyzed as a standalone phrase having a sentiment. Furthermore, the sentence "I saw the movie I love Lucy" does not comprise any sentiment phrase, and therefore would not cause the mining unit 220 using the mining process to associate a sentiment phrase to the non-sentiment phrase. The phrases database 120, in certain implementation, is a preloaded database and is updated periodically. However, it is also possible to automatically update the phrase database 120 upon detection of a phrase as being either one of a sentiment phrase or a non-sentiment phrase. Furthermore, a sentiment phrase within a non-sentiment phrase is ignored for this purpose as being a sentiment phrase and is only treated as part of the non-sentiment phrase. It should therefore be understood that a taxonomy is created by association of a non-sentiment phrase with a sentiment phrase. Hence, for example, in the context of the phrase "I hate the movie I Love Lucy" the sentiment phrase is "hate", the non-sentiment phrase is "I Love Lucy" and the phrases are associated together in accordance with the principles of the invention to create a taxonomy.

In addition, a comparative numerical value is associated with each sentiment. For example the phrase "love" may have a score of "+10", the phrase "indifferent" the score of "0" and the phrase "hate" the score of "−10". Hence positive sentiments would result with a positive score while negative sentiments would result in a negative score. Such score association may be performed initially manually, but over time the system 100, based on feedback can position the sentiment phrases relative to each other to determine an ever changing score value to every sentiment phrase. This is of high importance as language references change over time and references which may be highly positive can become negative or vice versa, or just decline or incline as the case may be.

In an embodiment, a weighted sentiment score corresponding to a plurality of sentiment phrases collected for a respective non-sentiment phrase is generated. That is, within a specific context, the plurality of sentiments associated with a non-sentiment phrase are collected and an aggregated score is generated. Such score may be further weighted to reflect the weight of each of the individual scores with respect to other scores.

The cleaned text that contains the phrases is now operated upon using an analysis process performed by an analysis unit 230 of the system 200. The analysis may provide based on the type of process information needed, the likes of alerts and financial information. An alert may be sounded by the alert system 250 if it is determined that a certain non-sentiment phrase, for example, a certain brand name, is increasingly associated with negative sentiment phrases. This may be of high importance as the manufacturer associated with the brand name would presumably wish to act upon such negative information as much as possible in real-time. Likewise, a positive sentiment association may be of interest for either supporting that sentiment by certain advertising campaigns to further strengthen the brand name, or otherwise providing certain incentives to consumers of products of the brand name.

In an embodiment of the invention, the analysis unit performs the analysis process that uses the associations of non-sentiment and sentiment phrases to periodically generate at least a statistical analysis on the associations of phrases. As will be described in detail below with reference to FIGS. 5-7, by performing the statistical analysis the sentiment of different taxonomy terms over time can be determined, that is, the trend of a sentiment phrase with respect of a non-sentiment phrase. In addition, the statistical analysis can determine the frequency of the same taxonomy term appearing in two different web-based data sources, e.g., social networks. As will be further discussed below, a plurality of reports and/or alerts can be generated responsive to the results of the statistical analysis.

Returning to FIG. 2, the analyzed data is stored in a data warehouse 240, shown also as data warehouse 130 in FIG. 1. Through a dashboard utility 270 it is possible to provide queries to the data warehouse 240. An advertisement network interface 280 further enables advertisement related management, for example providing advertisements relative to specific phrases used. In addition, the information is tuned by a tuning mechanism 290 therefore allowing for feedback to enable better mining of the data by the mining unit 220. In the case of advertisements a success rate, for example conversion rates, is also provided to the analysis unit 230 that performs an analysis process for better analysis of the cleaned text by creating real-time taxonomies.

An analysis may further include grouping and classification of terms in real-time, as they are collected by the system. Furthermore, current trends can be analyzed and information thereof provided, including, without limitation, an inclining trend and a declining trend with respect to the sentiment phrase associated with a non-sentiment phrase. Moreover, using the analysis tools it is possible to detect hidden connections, i.e., an association between non-sentiment phrases that have a correlation. For example, if a web site of a talk show refers more positively or more frequently to a brand name product, then the system through its phrase analysis is able to find the correlation between the non-sentiment phrases and then compare the sentiment phrases thereof. That way, if the talk show web site tends to favor and recommend the brand name product it would make more sense to spend, for example, advertisement money there, than if the sentiment phrase would be a negative one.

Figure 3:
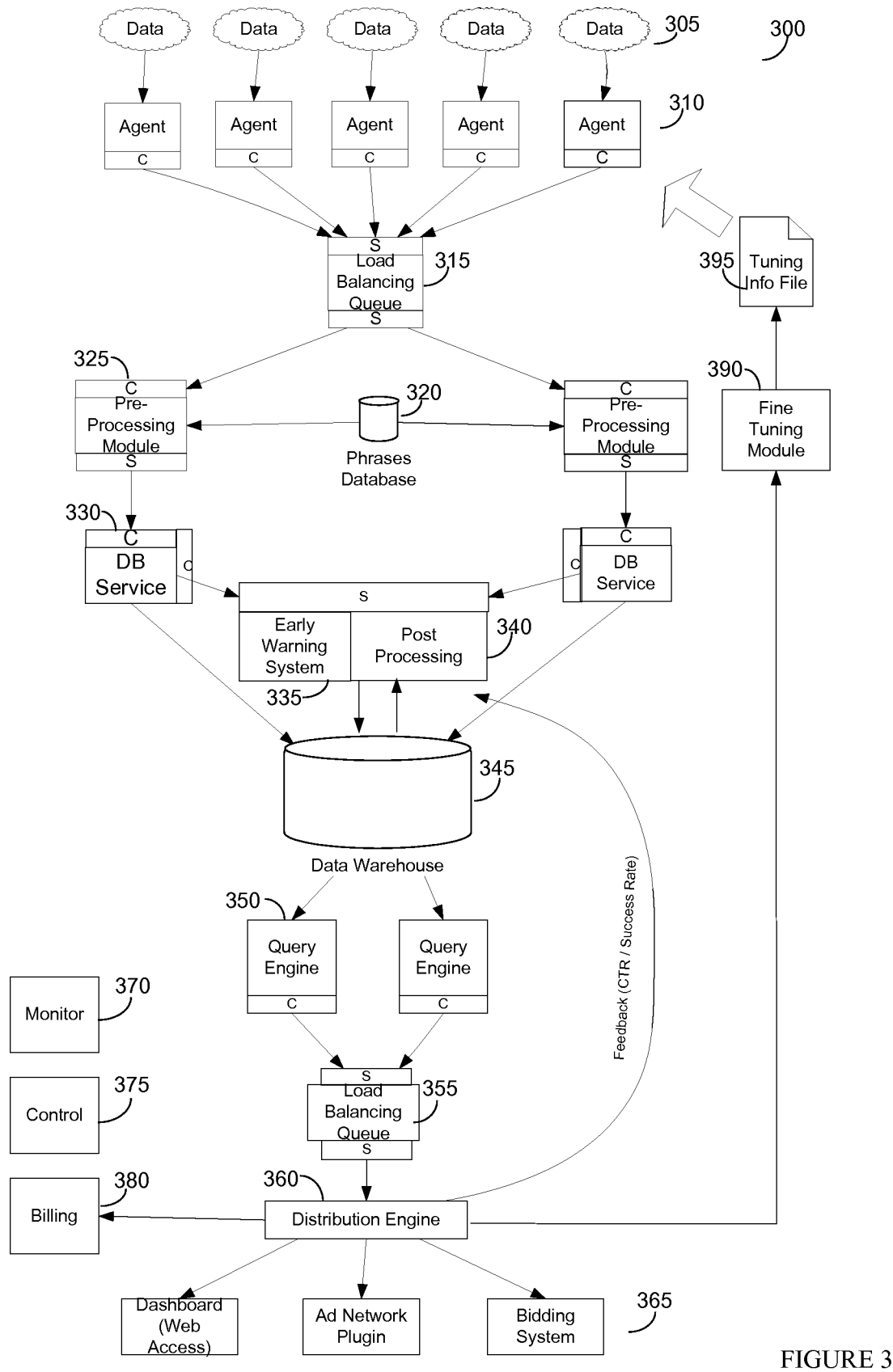
FIG. 3 is a detailed block diagram of the operation of the system depicted in FIGS. 1 and 2.

FIG. 3 shows an exemplary and non-limiting detailed block diagram of the operation of a system 300. Data sources 305, including for example Facebook® and Twitter™, are either probed periodically (pull) by agents 310 of the system 300, or received periodically therefrom (push). Such agents may be operative on the control server 140 or on any one of the processing units 170, when applicable. An optional load balancing queue 315, operative for example on the control server 140, balances the loads of the agents on the execution units such that their operation does not overload any such unit. In the exemplary and non-limiting implementation two processing paths are shown, however, more may be used as may be necessary.

In one embodiment, the loading of an agent 310 is also a function of the periodic checking of the respective data source 305. Each processing unit, for example, processing units 170, performs a preprocessing using the preprocessing module 325. The preprocessing, which is the mining of phrases as explained hereinabove, is performed respective of a phrases database 320 to which such processing units 170 are connected to by means of the network 110. A database service utility 330, executing on each processing node 170, stores the phrases in the data warehouse 345, shown in FIG. 1 as data warehouse 130. An early warning system 335, implemented on one of the processing units 170 or on the control server 140, is communicatively connected with the database service utility 330, and configured to generate early warning based on specific analysis. For example, increase of references to a brand name product above a threshold value may result in an alarm. In one embodiment, this happens only when the source of such rise is a specific source of interest. This is performed because some data sources 305 are more meaningful for certain non-sentiment phrases than others, and furthermore, some sentiment phrases are more critical when appearing in one source 305 versus another.

The second portion of the system 300 depicted in FIG. 3, concerns the ability to query the data warehouse 345 by one or more query engines 350, using an optional load balancing queue 355 as may be applicable. The queries may be received from a plurality of sources 365 including, but not limited to, a dashboard for web access, an advertisement network plugin, and a bidding system. The sources 365 are connected to a distribution engine 360 that receives the queries and submits them to the optional load balancing queue 355 as well as distributing the answers received thereto. The distribution engine 360 further provides information to a fine tuning module 390, executed, for example, on the control server 140. The information is provided, for example using a tuning information file 395. Other subsystems such as a monitor 370 for monitoring the operation of the system 300, a control 375 and a billing system 380 may all be used in conjunction with the operation of system 300.

Figure 4:
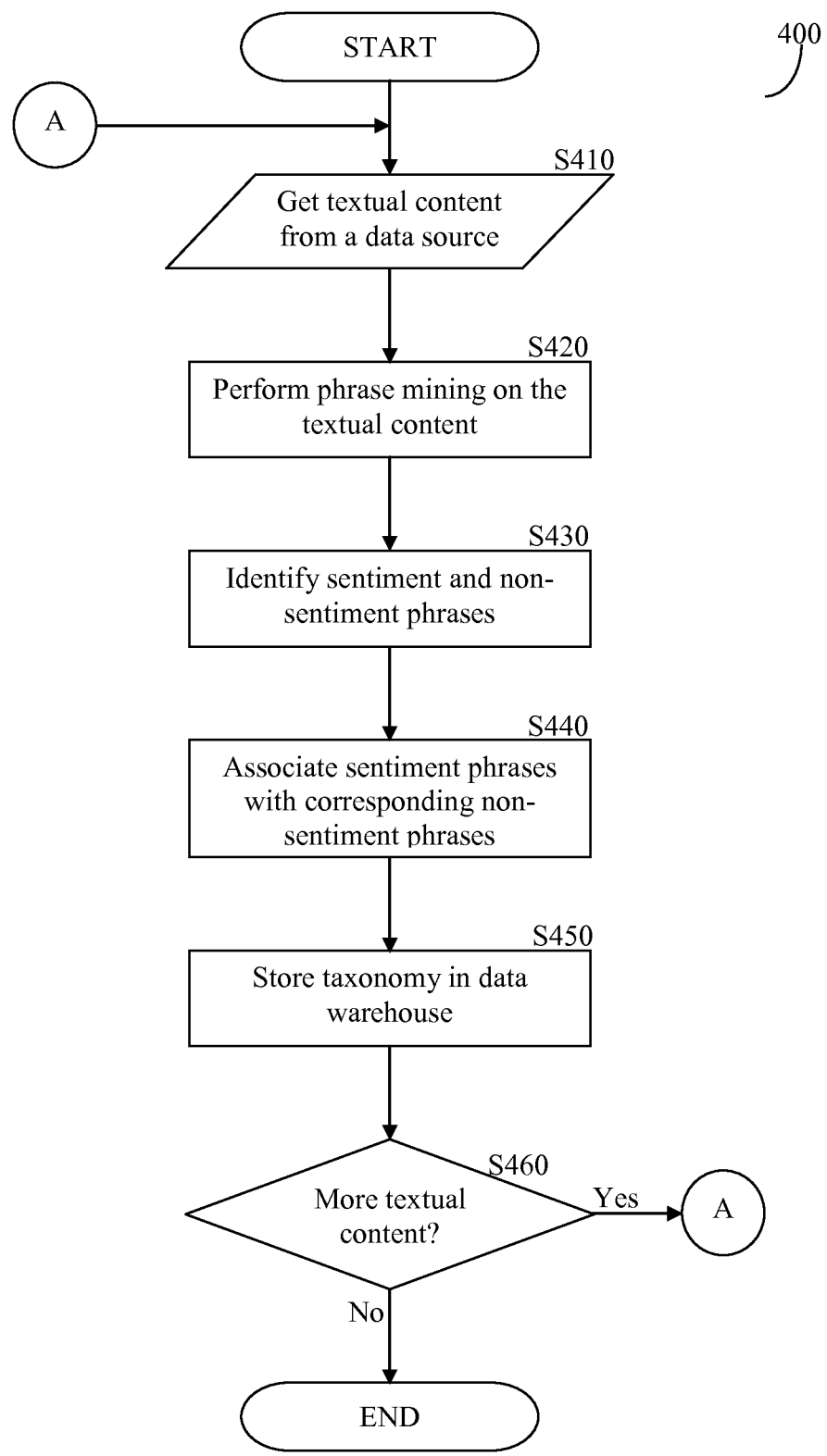
FIG. 4 is a flowchart creation of term taxonomies by mining web based user generated content.

FIG. 4 depicts an exemplary and non-limiting flowchart 400 describing the method for creation of term taxonomies. In S410 the system, for example and without limitations, any one of the systems 100, 200 and 300 described hereinabove, receives textual content from a source. As shown above, this can be performed by using agents 310. In S420 phrase mining is performed. As discussed hereinabove, the phrase mining includes at least the detection of phrases and in S430 identification and separation of sentiment and non-sentiment phrases. In S440, sentiment phrases are associated with non-sentiment phrases as may be applicable.

In S450, the taxonomies are created by association of non-sentiment phrases to respective sentiment phrases, including by, but not limited to, aggregation of sentiment phrases with respect to a non-sentiment phrase and vice versa. The created taxonomies are then stored in a data warehouse (e.g., the data warehouse 130 shown in FIG. 1). This enables the use of the data in the data warehouse by queries as also discussed in more detail hereinabove. In S460 it is checked whether additional text content is to be gathered and if so execution continues with S410; otherwise, execution terminates. It should be noted that an analysis takes place to determine the likes of current trends respective of the non-sentiment phrases based on their sentiment phrases, prediction of future trends, identification of hidden connections and the like.

Figure 5:
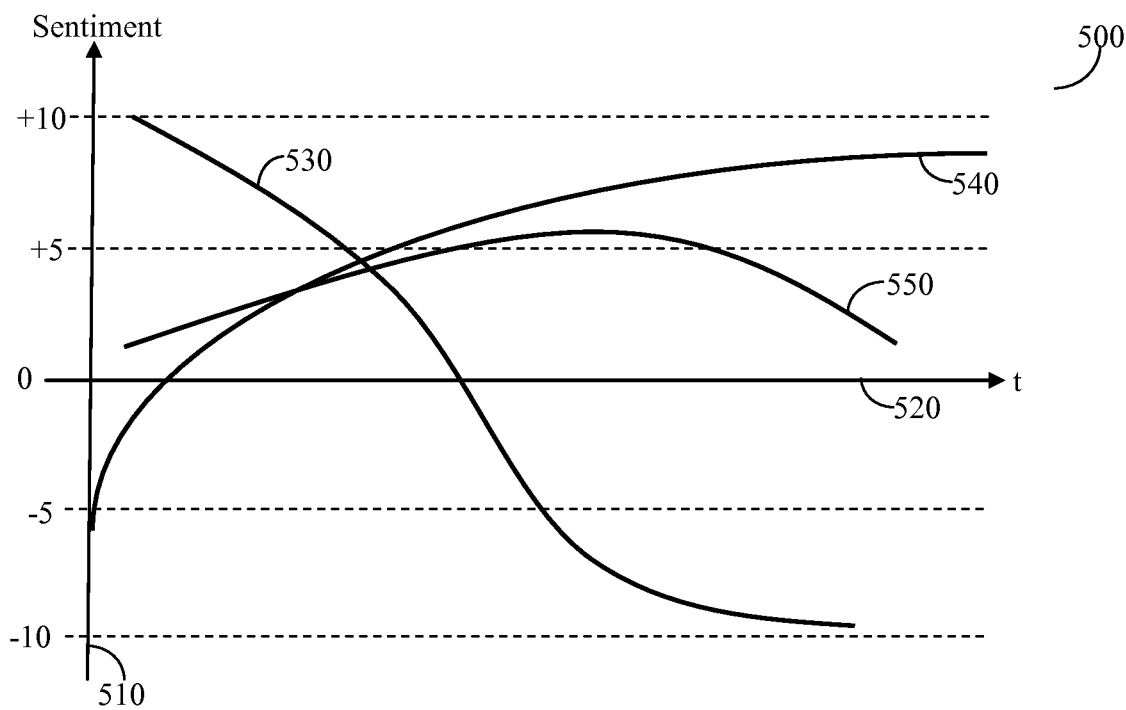
FIG. 5 is a sentiment chart over time for three different terms generated according to an embodiment of the invention.

Once sentiment taxonomies have been collected in accordance with the teachings discussed herein, it is also possible to perform a variety of trend analyses based on the collected information. Referring now to FIG. 5 there is shown an exemplary and non-limiting sentiment chart 500 generated according to an embodiment of the invention.

The chart 500 depicts the sentiment curves 530, 540 and 550 of three different terms over time. The horizontal axis 520 of the chart 500 represents time and the vertical axis 510 represents a sentiment value. In this particular example the range of the sentiment is from +10 to −10 where +10 represents a strong positive sentiment, and −10 represents a strong negative sentiment, as further described hereinabove.

Curve 530, which relates to the sentiment of a first term, declines over time. While it began with a very high positive sentiment it has declined steadily and at times rapidly over time. The curve 530 is created by continuous collection of sentiments from web-based user generated content, for example, a social network monitored by the systems 100, 200 and 300 described hereinabove in more detail. In one embodiment of the invention, the generation of an alert may be requested as a result of a decline of a sentiment below a desirable value, or, if the decline rate is faster than a predefined threshold.

The curve 540 describes a steadily increasing sentiment trend for the monitored term. It may be requested that such terms be correlated over time as these terms may behave inversely to each other and therefore a change in one may be of importance to the other. For example, if a sentiment to a product A decreases, the clients may be shifting to a product B for which the sentiment is increasing, and vice versa. The analysis and reporting is of high importance as it may allow a campaign manager to allocate resources to handle each situation. Moreover, it should be noted that in accordance to one embodiment of the invention, the search for correlation is performed automatically by the system in order to identify such high correlation, either negative or positive, between various terms and their respective taxonomies.

The chart 500 shows yet another curve, curve 550 which initially inclines and then declines. It would be appreciated by one of ordinary skill that a first derivative analysis of this curve 550 would reveal this trend towards reaching a peak in time and then the decline. Again, the importance of such information is with respect to the ability to act in response to such data. Moreover, as data is collected from a plurality of data sources, such as social networks, it is further possible to identify if the trend is unique to a certain social network, or otherwise spread between the different networks.

In an embodiment of the invention, the trends, examples of which are shown in chart 500, may be weighted data, such that the data from one social network may have a higher weight than the data reaching from another social network. The importance of one social network over another may be evaluated based on various parameters and may be fixed or dynamic.

Figure 6:
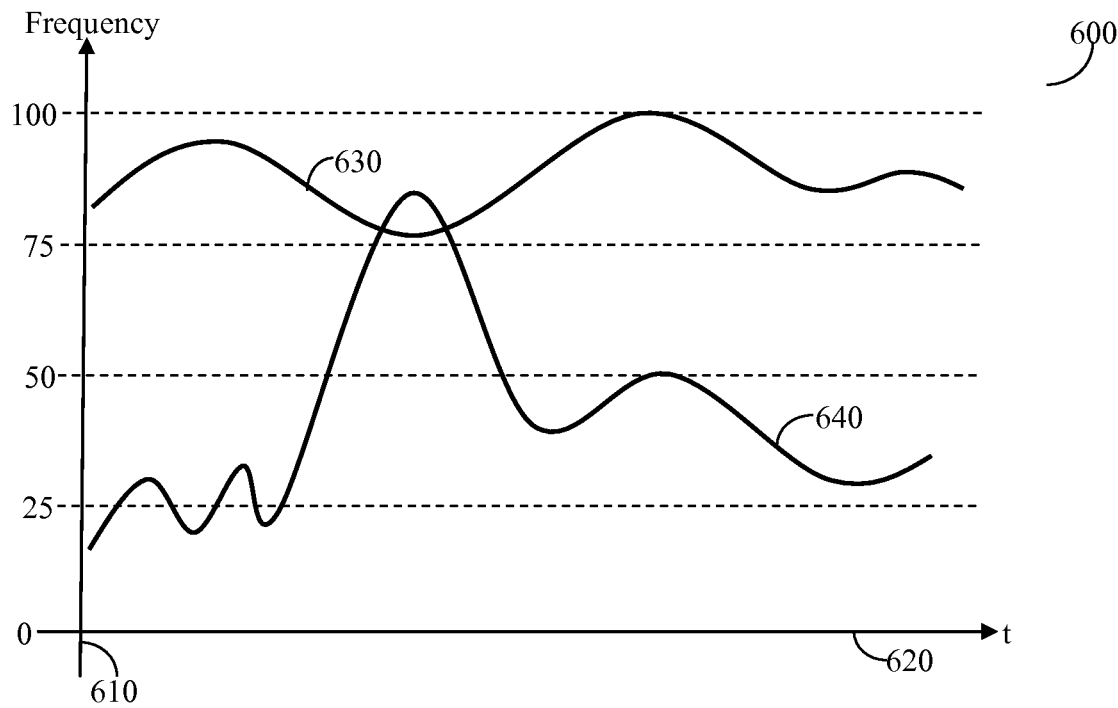
FIG. 6 is a frequency chart over time for the same taxonomy term in two different social networks according an embodiment of the invention.

Referring now to FIG. 6, an exemplary and non-limiting chart 600 is provided with respect to the frequency of the same taxonomy term appearing in two different data sources, e.g., social networks. The horizontal axis 620 represents time and the vertical axis 610 represents a frequency of occurrence which may be relative or absolute. There are two curves 630 and 640 which generally behave differently. In one point in time, the curve 640 has frequency values that are above the frequency of curve 630. However, as can be readily observed, this is almost a transient and generally the frequency for the second social network, represented by the curve 640, is much lower. In such a case one may use an average over time and a weighting system that is based on the average or median frequency of each of the curves, where the average or median of curve 630 is certainly much higher than the average or median of curve 640. The period of averaging may vary depending on system parameters and general behavior and provide a damping factor to the transient occurrence shown in chart 600. It should be appreciated that other statistical analysis is possible without departing from the spirit of the invention.

It should be noted that in accordance with an embodiment of the invention alerts may be set so that a notification is set respective of the frequency of mentioning of a term. This may be in a declining or inclining in mentioning frequency. Furthermore, an alert may be generated when a declining trend or inclining trend has shifted towards the opposite trend. This can be further tied with the sentiment analysis described hereinabove providing additional tools for real-time response by, for example, a campaign manager. In one embodiment of the invention, the system displays charts such as chart 500 and chart 600, preferably in real-time, on a display of a user using the disclosed system.

Figure 7:
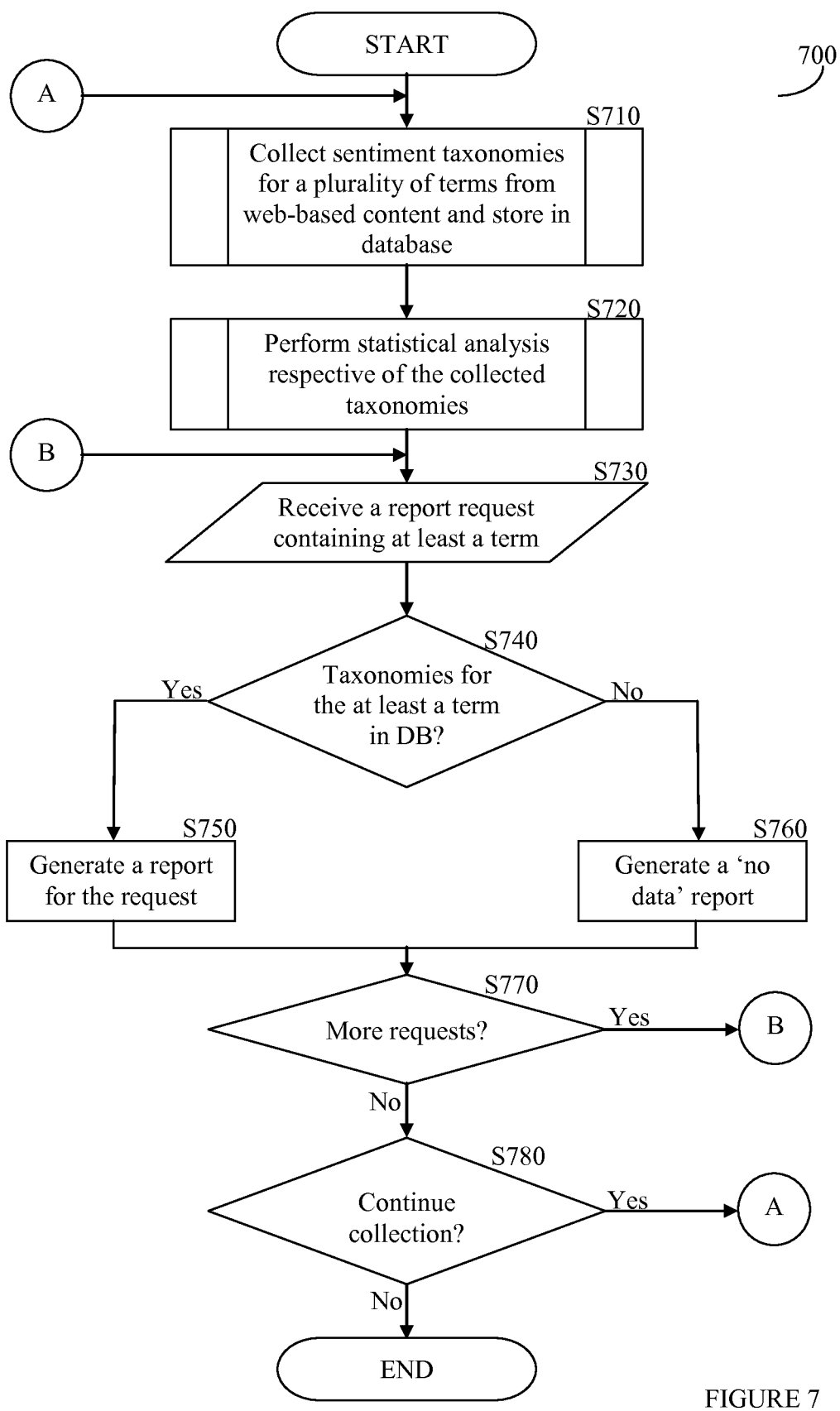
FIG. 7 is a flowchart describing a method for trend analysis according to certain embodiments of the invention.

FIG. 7 shows an exemplary and non-liming flowchart 700 of trend analysis according to an embodiment of the invention. In S710 collection of sentiment taxonomies takes place for a plurality of terms from web-based data sources, such as social networks and storing the identified taxonomies in a database. Such a process was described hereinabove with respect of FIGS. 1 through 4.

In S720, statistical analysis on the collected taxonomies is performed. The statistical analysis includes, but is not limited to, correlation between term taxonomies, frequency analysis, and so on and so forth. Several examples have been discussed hereinabove.

In accordance with an embodiment of the invention, the statistical analysis includes a correlation analysis between at least two non-sentiment phrases that is performed to determine their correlation respective of their respective sentiment phrases. For example, consider the case of the movie "I Love Lucy" having only the sentiment-phrase "Love" associated therewith. It would be then determined that there is a high correlation, "1" between the non-sentiment phrase "I Love Lucy" and the sentiment phrase "Love" and with it being a positive term a score of "+10" would be provided. Conversely, if only the sentiment-phrase "Hate" would be associated with "I Love Lucy" then while the correlation would also be "1" the fact that it is a negative sentiment phrase would cause the score to be "−10". If there would be an equal number of "Love" and "Hate" sentiment phrases associated with the non-sentiment phrase "I Love Lucy" then the score would be "0" as the overall sentiment is indifferent for the entire group of responders, even though there would be two distinct groups that could be handled separately.

In accordance with another embodiment of the invention, the statistical analysis includes a dynamic weighting of trends from different data sources based on one or more of the following: a frequency at each time interval and frequency over a plurality of time intervals to offset transients in trends. For example, one may consider two different sources of data, Facebook and Twitter, each providing sentiment phrases to the same non-sentiment phrases. With the different nature of use of each of these data sources it may be necessary to provide a weight to adjust for the characteristics of each of them. For example, Twitter being a relatively fast responder to trends may show a significant change over a baseline even though the numbers are quite small, and hence would require a weighting that would emphasis its early reaction. Such may also fade quickly from Twitter, but still linger on for a much longer time in Facebook requiring it now to have a higher weight on that data source. Thus, the weighting itself between the two data sources may change over time with respect to a taxonomy.

In S730 there is a received by the system a request for a report. The request may consist of one or more terms with requests for specific report items, such as correlation between two terms, or a request to show the strongest correlation between a given term and another term, or even a negative strong correlation between a given term and another term, and so on and so forth.

In S740 it is checked whether the requested term taxonomies are available. For example, it is checked if the requested taxonomies are stored in the database of the system (e.g., a data warehouse 130, 240 or 345). If S740 results with a No answer, execution continues with S760; otherwise, execution continues with S750 by generating the requested report and followed by S770. In S760 there is generated a 'no data' report, i.e., because of the lack of a taxonomy of a requested term the system cannot generate a requested report. In S770 it is checked whether additional requests are pending, and if so, execution returns to S730; otherwise, execution continues with S780. In S780, another check is made whether it is necessary to continue with the collection of data from the web-based data sources, and if so execution continues with S710; otherwise, execution terminates.

It should be noted that the system may allow the gathering of the sentiment with respect to a plurality of terms to generate a single understanding of a decline or incline in sentiment. For example, a company may use its brand name and one or more of its products to determine whether the sentiment is inclining or declining. Once such is determined, a course of action may be taken. In one embodiment, responsive to a report the system may recommend and/or execute the increase or decrease of expenditure on advertisement to offset an observed trend. That is, if it is seen that there is a declining sentiment the system may authorize or otherwise automatically increase the amounts spent on advertisements. In today's environment of increasing expenditure on multiple on-line channels, such an automatic real-time response to a real-time incline or decline in sentiment is essential for effective and efficient use of given budgets.

The various embodiments disclosed herein maybe implemented as hardware, firmware, software, or any combination thereof. Moreover, the software is preferably implemented as an application program tangibly embodied on a program storage unit or non-transitory computer readable medium consisting of parts, or of certain devices and/or a combination of devices. A non-transitory computer readable medium is any computer readable medium except for a transitory propagating signal. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for analyzing sentiment trends based on term taxonomies of user generated content, comprising:
   a network interface enabling access to one or more data sources through a network;
   a mining unit for collecting textual content from the one or more data sources and generating phrases, the phrases including sentiment phrases and non-sentiment phrases, each of the sentiment phrases including one or more words describing a sentiment, the sentiment being any one of a positive sentiment, a neutral sentiment, and a negative sentiment, each of the sentiment phrases being associated with a score indicating whether the sentiment phrase describes the sentiment;
   a non-transitory data warehouse storage medium connected to the network; and
   an analysis unit for generating term taxonomies that include at least associations between a non-sentiment phrase and at least one sentiment phrase based on the generated phrases, wherein generated term taxonomies are saved in the data warehouse,
   the analysis unit is further configured to periodically statistically analyze the stored term taxonomies to determine at least a statistical trend by performing a correlation analysis on at least two term taxonomies including performing a first correlation and a second correlation, wherein the first correlation is performed on a first stored term taxonomy comprising a non-sentiment phrase and a first sentiment phrase provided by a first group of users and wherein the second correlation is performed on a second stored term taxonomy including said non-sentiment phrase and a second sentiment phrase provided by a second group of users, wherein the first sentiment phrase is different from the second sentiment phrase and the first group of users is different from the second group of users, the analysis unit is further configured to store results of the at least statistical trend in the data warehouse storage, wherein the stored results are available upon receiving a request to generate a trend report regarding the at least statistical trend, wherein the analysis unit is further configured to perform a dynamic weighting of trends from different data sources of the one or more data sources based on at least a frequency that taxonomies results from each data source change.

2. The system of claim 1, wherein the analysis unit is further configured to provide the trend report respective of at least one sentiment phrase with respect of at least one non-sentiment phrase.

3. The system of claim 1, wherein the system further comprises:

an alert subsystem configured to generate an alert responsive of any one of: a trend detected from the trend report, crossing of a threshold determined from the trend report, a change in the trend, and a change in frequency occurrence of term taxonomies.

4. The system of claim 1, wherein the data source is at least one of: a social network, a blog, a web page, a news feed.

5. The system of claim 1, wherein the analysis unit further provides a recommendation to increase or decrease advertisement expenditure.

6. The system of claim 5, wherein advertisement expenditure is increased or decreased based on the correlation analysis between the at least two term taxonomies.

7. An apparatus for trend analysis of non-sentiment phrases appearing in at least one data source, comprising:
 a mining unit for periodically associating one or more sentiment phrases to one or more non-sentiment phrases and generating a plurality of term taxonomies by associating between the one or more non-sentiment phrases and the one or more sentiment phrases, wherein each of the one or more sentiment phrases includes one or more words describing a sentiment, the sentiment being any one of a positive sentiment, a neutral sentiment, and a negative sentiment, each of the one or more sentiment phrases being associated with a score indicating whether the sentiment phrase describes the sentiment;
 a non-transitory storage unit for storing the one or more non-sentiment phrases and the one or more sentiment terms associated with the one or more non-sentiment phrases; and
 an analysis unit for periodically determining at least a sentiment trend by performing a correlation analysis on at least two term taxonomies including performing a first correlation and a second correlation, wherein the first correlation is performed on a first stored term taxonomy comprising a non-sentiment phrase and a first sentiment phrase provided by a first group of users and wherein the second correlation is performed on a second stored term taxonomy including said non-sentiment phrase and a second sentiment phrase provided by a second group of users, wherein the first sentiment phrase is different from the second sentiment phrase and the first group of users is different from the second group of users, wherein the analysis unit is further configured to perform a dynamic weighting of trends from different data sources based on at least a frequency that taxonomies results from each data source change.

8. The apparatus of claim 7, further comprising:
 an alert unit for generating an alert responsive of one of: a trend, crossing of a trend threshold, a change in a trend, and a change in frequency occurrence of term taxonomies.

9. The apparatus of claim 7, wherein the data source is at least one of: a social network, a blog, a web page, and a news feed.

10. The apparatus of claim 7, wherein the analysis unit further provides a recommendation to increase or decrease advertisement expenditure.

11. The apparatus of claim 10, wherein the advertisement expenditure is increased or decreased based on the correlation analysis between the at least two term taxonomies.

12. A method for generating a trend report for a non-sentiment phrase, comprising:
 generating a plurality of term taxonomies by associating between non-sentiment phrases and sentiment phrases, wherein each of the sentiment phrases includes one or more words describing a sentiment, the sentiment being any one of a positive sentiment, a neutral sentiment, and a negative sentiment, each of the sentiment phrases being associated with a score indicating whether the sentiment phrase describes the sentiment;
 storing the plurality of term taxonomies in a non-transitory computer database;
 performing periodically at least a statistical analysis respective of the plurality of term taxonomies in the database by performing a correlation analysis including performing a first correlation and a second correlation, wherein the first correlation is performed on a first stored term taxonomy comprising a non-sentiment phrase and a first sentiment phrase provided by a first group of users and wherein the second correlation is performed on a second stored term taxonomy including said non-sentiment phrase and a second sentiment phrase provided by a second group of users, wherein the first sentiment phrase is different from the second sentiment phrase and the first group of users is different from the second group of users;
 receiving a request for a report with respect of at least a non-sentiment phrase in the database;
 dynamically weighting of trends from one or more data sources based on at least a frequency that taxonomies results from each data source change;
 generating a trend report based at least on the at least statistical analysis; and
 providing the report to the requestor of the report.

13. The method of claim 12, wherein generating the plurality of term taxonomies comprises:
 crawling the one or more data sources by an agent operative on a computing device to collect textual content from the one or more data sources;
 performing phrase extraction using the textual content and generating phrases;
 identifying sentiment phrases and non-sentiment phrases from the phrases; and
 associating a sentiment phrase with at least a non-sentiment phrase, wherein an association between a non-sentiment phrase and at least one corresponding sentiment phrase is a term taxonomy.

14. The method of claim 13, wherein identifying the sentiment phrases and non-sentiment phrases comprises:
 comparing the phrases to sentiment phrases and non-sentiment phrases stored in a phrases database;
 determining that a phrase is a sentiment phrase if a match is found between the phrase and at least one sentiment phrase in the phrase database; and
 determining a phrase is a non-sentiment phrase when a match is found between the phrase and at least one non-sentiment phrase in the phrase database.

15. The method of claim 13, wherein each of the one or more data sources is at least one of: a social network, a blog, a web page, and a news feed.

16. The method of claim 12, wherein the score is one of: negative, neutral, positive.

17. The method of claim 16, wherein the negative score is a range of negative values and wherein the positive score is a range of positive values.

18. The method of claim 17, further comprising:
 generating a weighted sentiment score corresponding to a plurality of sentiment phrases collected for a respective non-sentiment phrase.

19. The method of claim 12, further comprising:
 generating an alert responsive of one of: a trend detected from the trend report, crossing of a threshold determined from the trend report, a change in a trend, and a change in a frequency occurrence of term taxonomies.

20. The method of claim 12, further comprising: providing a recommendation to increase or decrease advertisement expenditure.

21. The method of claim 20, wherein the advertisement expenditure is increased or decreased based on the correlation analysis between the at least two term taxonomies to determine their correlation respective of their respective sentiment phrases.

22. A computer software product containing a plurality of instructions embedded in a non-transitory computer readable medium that when executed by a computing device causing to execute the method of claim 12.

* * * * *